United States Patent
Loo et al.

(10) Patent No.: US 9,729,582 B2
(45) Date of Patent: Aug. 8, 2017

(54) METHODS, SYSTEMS, AND COMPUTER READABLE MEDIA FOR GENERATING SOFTWARE DEFINED NETWORKING (SDN) POLICIES

(71) Applicant: The Trustees of the University of Pennsylvania, Philadelphia, PA (US)

(72) Inventors: Boon Thau Loo, Cherry Hill, NJ (US); Yifei Yuan, Philadelphia, PA (US); Rajeev Alur, Wynnewood, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 15/236,165

(22) Filed: Aug. 12, 2016

(65) Prior Publication Data
US 2017/0093924 A1 Mar. 30, 2017

Related U.S. Application Data

(60) Provisional application No. 62/234,613, filed on Sep. 29, 2015.

(51) Int. Cl.
*H04L 29/06* (2006.01)
(52) U.S. Cl.
CPC ........ *H04L 63/20* (2013.01); *H04L 29/06986* (2013.01)
(58) Field of Classification Search
CPC .......................... H04L 63/20; H04L 29/06986
See application file for complete search history.

(56) References Cited

U.S. PATENT DOCUMENTS

| | | | |
|---|---|---|---|
| 9,252,972 B1* | 2/2016 | Dukes | H04L 49/70 |
| 9,450,823 B2* | 9/2016 | Arora | H04L 41/0803 |
| 2014/0075498 A1* | 3/2014 | Porras | H04L 63/107 726/1 |
| 2015/0281127 A1* | 10/2015 | Liu | H04L 47/2475 370/401 |
| 2016/0050117 A1* | 2/2016 | Voellmy | H04L 12/6418 370/392 |
| 2016/0050223 A1* | 2/2016 | Dhawan | H04L 63/1441 726/22 |
| 2016/0173338 A1* | 6/2016 | Wolting | H04L 41/145 709/223 |
| 2016/0212171 A1* | 7/2016 | Senanayake | H04L 63/20 |
| 2016/0254959 A1* | 9/2016 | Arndt | H04L 41/0816 |

(Continued)

OTHER PUBLICATIONS

"HP OpenFlow and SDN Technical Overview", Technical Solution Guide, Version 1, Sep. 2013, 19 pages.*

(Continued)

*Primary Examiner* — Michael Pyzocha
(74) *Attorney, Agent, or Firm* — Jenkins, Wilson, Taylor & Hunt, P.A.

(57) ABSTRACT

Methods, systems, and computer readable media for generating SDN policies are disclosed. One system includes a processor and a memory. The system also includes an SDN policy synthesizer (SPS) implemented using the processor and the memory. The SPS is configured to receive scenario based information indicating one or more behaviors for at least one SDN policy, to use a synthesis algorithm for generating the at least one SDN policy based on the scenario based information, and to provide the at least one SDN policy to an SDN controller.

20 Claims, 16 Drawing Sheets

(56) References Cited

U.S. PATENT DOCUMENTS

2016/0294871 A1* 10/2016 Huston, III ............. H04L 63/20
2016/0308905 A1* 10/2016 Stiekes ................... H04L 63/20

OTHER PUBLICATIONS

Cascone, Carmelo et al., "Traffic Management Applications for Stateful SDN Data Plane", Aug. 13, 2015, 6 pages.*
Al-Fares et al., "A scalable commodity data center network architecture," SIGCOMM CCR, Seattle, Washington, USA, pp. 63-74 (2008).
Anderson et al., "NetKat: Semantic foundations for networks," POPL '14, San Diego, CA, USA (2014).
Ball et al., "Vericon: Towards verifying controller programs in software-defined networks," PLDI '14, Edinburgh, United Kingdom (2014).
Bianchi et al., "Openstate: Programming platform-independent stateful OpenFlow applications inside the switch," ACM SIGCOMM Computer Communication Review, vol. 44, No. 2, pp. 45-51 (2014).
Canini et al., "A Nice way to test OpenFlow applications," NSDI (2012).
Foster et al., "Frenetic: A network programming language," ICFP '11, Tokyo, Japan (2011).
Gold, "Complexity of automaton identification from given data," Information and Control, vol. 37, pp. 302-320 (1978).
Gulwani, "Automating string processing in spreadsheets using input-output examples," PoPL '11, Austin, Texas, USA (2011).
Harel, "Can programming be liberated, period?" Computer, IEEE Computer Society, pp. 28-37 (2008).
Harel et al., "Behavioral programming," Communications of the ACM, vol. 55, No. 7, pp. 90-100 (2012).
Kim et al., "Kinetic: Verifiable dynamic network control," NSDI, pp. 1-14 (2015).
Lantz et al., "A network in a laptop: Rapid protoyping for software-defined networks," Hotnets '10, Monterey, CA, USA, pp. 1-6 (2010).
Loo et al., "Declarative networking," CACM (2009).
Monsanto et al., "A compiler and run-time system for network programming languages," POPL '12, Philadelphia, PA, USA (2012).
Monsanto et al., "Composing software defined networks," NSDI (2013).
Moshref et al., "Flow-level state transition as a new switch primitive for SDN,"HotSDN '14, Chicago, IL, USA (2014).
Tootoonchian et al., "On controller performance in software-defined networks," HotICE (2012).
Udupa et al., "TRANSIT: Specifying protocols with concolic snippets," PLDI '13, Seattle, WA, USA, pp. 1-10 (2013).
Voellmy et al., "Maple: Simplifying SDN programming using algorithmic policies," SIGCOMM '13, Hong Kong, China (2013).
Yuan et al., "NetEgg: Programming network policies by examples," HotNets-XIII, Los Angeles, CA, USA, pp. 1-7 (2014).

* cited by examiner

Input: a packet $p$
for $i = 1$ to $n$ do
  if rule $r_i$ matches $p$ then
    execute the actions and update of rule $r_i$ on $p$
    update_flowtable($p$)
    return
  end if
end for
apply default actions to $p$

FIG. 3

$p_1$: <port=2, srcmac=A, dstmac=B>
$p_2$: <port=1, srcmac=B, dstmac=A>
$p_3$: <port=2, srcmac=A, dstmac=B>
$p_4$: <port=3, srcmac=A, dstmac=B>

(a) An example packet trace

| MAC | state | value |
|---|---|---|
| A | 0 | - |
| B | 0 | - |

(b) The initial state table

| MAC | state | value |
|---|---|---|
| A | 1 | 2 |
| B | 0 | - |

(c) The state table after $p_1$

| MAC | state | value |
|---|---|---|
| A | 1 | 2 |
| B | 1 | 1 |

(d) The state table after $p_2$

| MAC | state | value |
|---|---|---|
| A | 1 | 3 |
| B | 1 | 1 |

(e) The state table after $p_4$

FIG. 4

| | | |
|---|---|---|
| Packet-type | $p$ | $::= \langle f_1 : \tau_1, \ldots, f_k : \tau_k \rangle$ |
| Symbolic packet | $sp$ | $::= \langle sv_1, \ldots, sv_k \rangle$ |
| Action | $a$ | $::= \text{drop} \mid \text{flood} \mid \text{send}(\text{port}) \mid \text{modify}(f, v) \mid \ldots$ |
| Event | $e$ | $::= sp \Rightarrow [a_1, \ldots, a_i]$ |
| Scenario | $sc$ | $::= [e_1, \ldots, e_j]$ |
| Program | $prog$ | $::= \{sc_1, \ldots, sc_n\}$ |

FIG. 5

| match | actions |
|---|---|
| srcip=A, dstip=C | drop |
| srcip=A, dstip=* | send(1) |
| srcip=*, dstip=B | send(2) |

(b) The policy table.

$A, ip1 \Rightarrow send(1)$
$ip2, B \Rightarrow send(2)$
$A, C \Rightarrow drop$ (a) A scenario.

FIG. 6 scenario 1:
$s_1, P_1, h_1, h_2 \Rightarrow$ flood
$s_1, P_2, h_3, h_1 \Rightarrow$ send($P_1$)
$s_1, P_3, h_2, h_3 \Rightarrow$ send($P_2$)

FIG. 7 scenario 2:
1, $h_1, h_2 \Rightarrow$ send(2)
2, $h_2, h_1 \Rightarrow$ send(1)

scenario 1:
2, $h_2, h_1 \Rightarrow$ drop

FIG. 8 modified scenario 2:
1,$h_1,h_2 \Rightarrow$ send(2)
2,$h_2,h_3 \Rightarrow$ send(1)

FIG. 9 scenario 3:
packetin,-,1,$h_1$,$h_2$ $\Rightarrow$ send(2)
timeout,$h_2$,-,-,- $\Rightarrow$ nop
packetin,-,2,$h_2$,$h_3$ $\Rightarrow$ drop

FIG. 10 scenario 1:
SYN,$ip_1$,$ip_2$,$port_1$,$port_2$ ⇒ allow
ACK,$ip_2$,$ip_1$,$port_2$,$port_1$ ⇒ allow scenario 2:
SYN,$ip_1$,$ip_2$,$port_1$,$port_2$ ⇒ allow
SYNACK,$ip_2$,$ip_1$,$port_2$,$port_1$ ⇒ allow
ACK,$ip_1$,$ip_2$,$port_1$,$port_2$ ⇒ allow scenario 3:
ACK,$ip_2$,$ip_1$,$port_2$,$port_1$,$port_2$ ⇒ deny scenario 4:
SYNACK,$ip_2$,$ip_1$,$port_2$,$port_1$ ⇒ deny scenario 5:
SYN,$ip_1$,$ip_2$,$port_1$,$port_2$ ⇒ allow
ACK,$ip_1$,$ip_2$,$port_1$,$port_2$ ⇒ deny

FIG. 11 scenario 1:
$h_1.\text{request},ip_1,ip_2 \Rightarrow \text{flood}$
$h_3.\text{request},ip_3,ip_1 \Rightarrow \text{reply}(h_1)$
$h_4.\text{request},ip_4,ip_3 \Rightarrow \text{reply}(h_3)$ scenario 2:
$h_2.\text{reply},ip_2,ip_1 \Rightarrow \text{flood}$
$h_3.\text{request},ip_3,ip_2 \Rightarrow \text{reply}(h_2)$

FIG. 12

METHODS, SYSTEMS, AND COMPUTER READABLE MEDIA FOR GENERATING SOFTWARE DEFINED NETWORKING (SDN) POLICIES

PRIORITY CLAIM

This application claims the benefit of U.S. Provisional Patent Application Ser. No. 62/234,613 filed Sep. 29, 2015; the disclosure of which is incorporated herein by reference in its entirety.

GOVERNMENT INTEREST

This invention was made with government support under Grant No. ITR-1138996 and CNS-1218066 awarded by the National Science Foundation and Grant No. FA9550-12-1-0327 awarded by the Air Force Office of Scientific Research (AFOSR). The government has certain rights in the invention.

TECHNICAL FIELD

The subject matter described herein relates to computer network configuration. More particularly, the subject matter described herein relates to methods, systems, and computer readable media for generating SDN policies.

BACKGROUND

Software defined networking (SDN) holds the promise of extensible routers that can be customized directly by network operators. Major router vendors now provide application programming interfaces (APIs) and/or communications interfaces (e.g., OpenFlow) that provide various forms of extensibility for traffic steering, on-demand network virtualization, security policies, and dynamic service chaining. The enhanced programming interface of SDN offers an opportunity to design domain specific programming abstractions for network operators to take advantage of the flexibility to program network policies.

However, a key challenge that has yet to be addressed is providing an intuitive programming abstraction that allows network operators even with little programming experiences to program their own protocols and policies, thereby taking advantage of the new programming interface.

Accordingly, there exists a need for improved methods, systems, and computer readable media for generating SDN policies.

SUMMARY

Methods, systems, and computer readable media for generating SDN policies are disclosed. One system includes a processor and a memory. The system also includes an SDN policy synthesizer (SPS) implemented using the processor and the memory. The SPS is configured to receive scenario based information indicating one or more behaviors for at least one SDN policy, to use a synthesis algorithm for generating the at least one SDN policy based on the scenario based information, and to provide the at least one SDN policy to an SDN controller.

The subject matter described herein may be implemented in hardware, software, firmware, or any combination thereof. As such, the terms "function", "node", or "module" as used herein refer to hardware, which may also include software and/or firmware components, for implementing the feature(s) being described. In some exemplary implementations, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 3 depicts pseudocode used by SDN policy interpreter 210 according to an embodiment of the subject matter described herein;

FIG. 4 depicts an illustrative execution for an incoming packet trace according to an embodiment of the subject matter described herein;

FIG. 5 depicts various components of a configuration language for expressing network timing diagrams according to an embodiment described herein;

FIGS. 6A and 6B depict a scenario and a policy table for a firewall according to an embodiment described herein;

FIG. 7 depicts a scenario for a learning switch according to an embodiment described herein;

FIG. 8 depicts a scenario for a first stateful firewall according to an embodiment described herein;

FIG. 9 depicts a modified scenario for a second stateful firewall according to an embodiment described herein;

FIG. 10 depicts an added scenario for a third stateful firewall according to an embodiment described herein;

FIG. 11 depicts a scenario for a transmission control protocol (TCP) firewall according to an embodiment described herein;

FIG. 12 depicts a scenario for an address resolution protocol (ARP) proxy according to an embodiment described herein;

DETAILED DESCRIPTION

Figure 1:
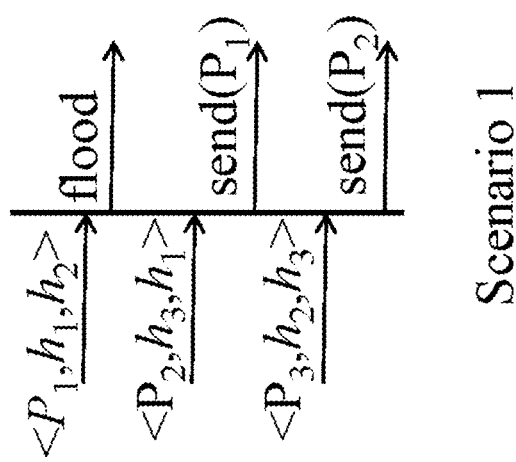
FIG. 1 is a timing diagram describing a learning switch according to an embodiment of the subject matter described herein.

The subject matter described herein relates to scenario based programming and includes methods, techniques, and mechanisms for generating network policies using representative example behaviors, also referred to herein as scenarios. In accordance with some aspects of the subject matter described herein, methods, techniques, and mechanisms (e.g., a synthesis algorithm and/or a policy synthesizer) may be used for generating SDN policies and/or other networking policy information using user-provided scenarios. For example, an exemplary synthesis algorithm may use timing diagrams or other configuration information to automatically infer the controller state that needs to be maintained along with the flow table rules to process network events and update state.

In accordance with some aspects of the subject matter described herein, methods, techniques, and mechanisms may be used for executing generated policies and/or related information and may infer or interpret rules that can be provided to network nodes, e.g., via a SDN communications interface. For example, an exemplary policy interpreter may be implemented in various SDN controllers and may use various programming languages and/or communications interfaces when interpreting and executing a policy generated using user-provided scenarios.

In accordance with some aspects of the subject matter described herein, methods, techniques, and mechanisms (e.g., a synthesis algorithm executing on a processor) may be used for generating scenario based policies that have performance comparable to their handcrafted (e.g., manually programmed) counterparts that generally take significantly longer to generate. For example, in testing, results indicated that a synthesis algorithm in accordance with aspects of the subject matter described herein can generate policy implementations in seconds, whereas manually programmed policies may take hours or even days.

1. Introduction

Some aspects of the subject matter described herein include a scenario based programming framework, a system, and/or a related tool usable for synthesizing an implementation (e.g., an SDN policy) automatically from example scenarios and providing a platform (e.g., an actual SDN deployment executing the synthesized policy and a graphical user interface (GUI) application) whereby operators can observe the synthesized implementation at runtime, and then tweak their input scenarios to refine the synthesized implementation. For example, a scenario based programming framework may represent a rapid prototyping platform where users can iterate through example scenarios, observe runtime behavior to determine correctness, and tweak their scenarios as needed.

Some aspects of the subject matter described herein utilize user-provided examples or scenarios, such as timing diagrams, to design new network configurations and policies. With prior systems, these examples would be generalized into design documents, followed by pseudocode, and then finally implementation. Advantageously, some aspects of the subject matter described herein may facilitate the entire process by generating implementations directly from the examples themselves, hence giving the power of network programmability to all network operators. Further, while the examples described herein focuses mainly on SDN settings, the subject matter described herein can be applied to any network protocol design and implementation.

An exemplary scenario based programming framework, a system, and/or a related tool is discussed in further details below (Sections 3 and 4). As stated above, scenario based programming frameworks allow network operators to specify network policies using example behaviors. Instead of implementing a network policy by programming, the network operator may simply specifies the desired network policy using scenarios, which consist of examples of packet traces, and corresponding actions to each packet.

An exemplary synthesis algorithm and an interpreter for executing policies are discussed in further details below (Section 5). Given the scenarios as input, the synthesizer automatically generates a controller program that is consistent with example behaviors, including inferring the state that needs to implement the network policy, relevant fields associated with the state and rules for processing packets and updating states. The interpreter executes the generated policy program for incoming network events on an SDN controller, as well as infers rules that can be pushed onto switches (Section 6).

Validation including testing and results are also discussed in further details below. For example, some testing involves using an exemplary programming tool for synthesizing SDN programs (e.g., policies) that use an SDN controller, e.g., SDN controller 208. System 200 may be agnostic to the choice of SDN controllers, and can also be used in non-SDN environments to generate non-SDN policies or settings. Using an exemplary scenario based programming framework, a range of network policies is synthesized or generated using a small number of examples in seconds (Section 7). The synthesized controller program has low performance overhead and achieves comparable performance to equivalent imperative programs implemented manually in POX (Section 8). Moreover, the example scenarios are concise compared to equivalent imperative programs.

In some embodiments, an exemplary scenario based programming framework, a system, and/or a related tool may represent or act as a rapid prototyping platform where users can iterate through scenarios, observe runtime behavior to determine correctness, and tweak their scenarios otherwise. In such embodiments, the exemplary scenario based programming framework, system, and/or related tool may generate policies that are correct and consistent with respect to the input scenarios. Synthesizing the input scenarios themselves based on high level correctness properties may also be performed.

2. Illustrative Example

To illustrate various aspects of the subject matter described herein, consider the example where a network operator wants to program a learning switch policy supporting migration of hosts on top of an SDN controller for a single switch. The learning switch learns incoming ports for hosts. For an incoming packet, if the destination MAC address is learnt, the learning switch sends this packet out to the port associated with the destination MAC address; otherwise the learning switch floods the packet. To support migration of hosts, the learning switch needs to remember the latest incoming port of a host.

To program or generate a policy, a network operator may describe example behaviors of the policy in representative scenarios, e.g., in the form of network timing diagrams. FIG. 1 shows a scenario describing example behaviors for a policy using three packets. Each packet is denoted by a 3-tuple: (incoming port, source MAC, destination MAC). The first packet arriving on port $P_1$ with source MAC address $h_1$ and destination MAC address $h_2$ is flooded by the switch, since no port has been learnt for $h_2$. The second packet from $h_3$ to $h_1$ should be sent directly to the port $P_1$, according to the port learnt from the first packet. The third packet from $h_2$ to $h_3$ should be sent to the port $P_2$, since the second packet indicts that $h_3$ is associated with port $P_2$. Note that instead of using real port numbers and MAC addresses in the packet, the network operator uses variables for each field. The variables represent a variety of concrete values.

Given this scenario, an exemplary scenario based programming framework described herein may automatically synthesize the desired program or policy. The synthesized program can be executed on the SDN controller, as well as install flow table rules onto switches. As part of the program generation, an exemplary scenario based programming framework described herein may automatically generate the data structures and code necessary to implement the policy.

Network operators may further test the synthesized program using existing verification and testing techniques, and may refine the program if needed. As part of refinement, network operators may simply illustrate new scenarios (e.g., obtained from counter examples) to an exemplary scenario based programming framework described herein, and the framework may automate the refinement by synthesizing a new program from the new set of scenarios. Use cases are discussed in Section 7.

3. System Overview

Figure 2:
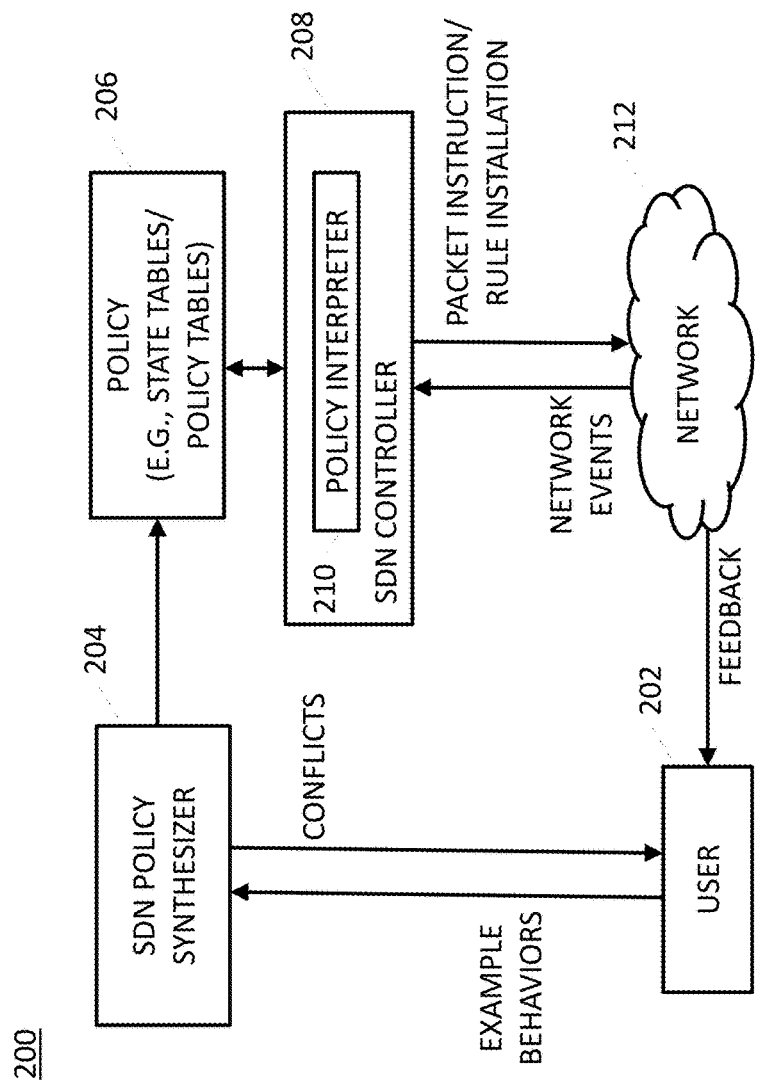
FIG. 2 is a high level block diagram illustrating a system for generating SDN policies according to an embodiment of the subject matter described herein.

FIG. 2 is a high level block diagram illustrating a system 200 for generating SDN policies according to an embodiment of the subject matter described herein. System 200 may represent one or more suitable entities (e.g., a computing platform, software executing on one or more processors, a logic device, a complex programmable logic device (CPLD), a field-programmable gate array (FPGA), and/or an application specific integrated circuit (ASIC)) for performing aspects of the subject matter described herein. In some embodiments, system 200 may include an SDN policy synthesizer 204 and an SDN policy interpreter 210.

SDN policy synthesizer 204 may represent any suitable entity (e.g., software executing on one or more physical processors) for generating SDN policies or a related program. SDN policy synthesizer 204 may generate an SDN policy 206 based on scenarios provided by a user 202. User 202 (e.g., a network operator) may describe example behaviors about the desired network policy in representative scenarios (e.g., network timing diagrams) to SDN policy synthesizer 204. For example, network timing diagrams may be provided to SDN policy synthesizer 210 and may be written in a configuration language, such as one described in Section 4.

In some embodiments, after receiving scenarios, SDN policy synthesizer 204 may first check whether there exist conflicts among the scenarios. If two scenarios conflict with one another, SDN policy synthesizer 204 may notify or display (e.g., via a GUI) the conflict to the network operator. After the operator resolves all conflicts, SDN policy synthesizer 204 may generate SDN policy 206 described in the scenarios.

In some embodiments, SDN policy 206 may use a set of state tables and a policy table. State tables may store state information, such as the history of a policy execution. The policy table may dictate the actions for processing incoming network events and updates to state tables for various cases.

SDN policy 206 may be sent to an SDN controller 208 for implementing SDN policy 206 in network 212. SDN controller 208 may include an SDN policy interpreter 210. SDN policy interpreter 210 may represent any suitable entity (e.g., software executing on one or more physical processors) for interpreting SDN policy 206. For example, when executing SDN policy 206, SDN policy interpreter 210 may look up a related policy table for incoming network events (e.g., packetin, connectionup, and other events), which will determine state table updates and actions to be applied to the network events. In some embodiments, SDN policy interpreter 210 may automatically infer rule updates to the data plane from current state of the policy execution, thus reducing controller overhead and network delay.

Using SDN policy interpreter 210, SDN controller 208 may provide packet instructions and/or rule installation to packet gateway routers and/or other network nodes in network 212. In some embodiments, various network nodes may provide feedback and/or notifications (e.g., error messages) to user 212.

It will be appreciated that system 200 is illustrative. Further, aspects of the subject matter described herein, including a synthesis algorithm based on scenarios, may be usable for handling any other network events and/or different policies.

Revisiting the learning switch example from the previous section, state tables that are generated by system 200 are described before describing the policy.

3.1 State Tables

In the above example, the learning switch needs to remember whether a port is learnt for a MAC address, and if learnt, which port is associated with the MAC address. Hence, the generated policy maintains a state table ST, which stores a state and a value (e.g., a port number) for each MAC address. An example of the snapshot of ST is shown below in Table 0.

TABLE 0

| MAC | STATE | VALUE |
|-----|-------|-------|
| A   | 1     | 2     |
| OP  | ...   | ...   |

System 200 may automatically derive that for a given MAC address macaddr, the state of macaddr in ST is either 0 or 1, indicating that the port associated with macaddr is unknown, or learnt, respectively. ST also stores a value (e.g., a port number) for MAC addresses with state 1. Initially, the program (e.g., system 200) may assign all states in the table to be 0. The program accounts for two cases: 1) When the destination port is unknown, it floods the packet through all ports; 2) When the incoming packet's destination port is known, it sends the packet out through the port associated with the destination MAC address. In both cases, the state associated with the source MAC address is set to be 1, and the incoming port for the source MAC address is remembered.

3.2 Policy Tables

The state table is manipulated by rules implementing the desired policy. These rules are captured in a policy table, as shown in Table 1 for the learning switch example. The discussion of its generation is in Section 5.

TABLE 1

| MATCH | TEST | ACTIONS | UPDATE |
|-------|------|---------|--------|
| *     | ST(dstmac).state=0 | flood | ST(srcmac):=(1,port) |
| *     | ST(dstmac).state=1 | Send(ST(dstmac).value | ST(srcmac):=(1,port) |

Table 1 depicts the policy table for the learning switch example above. As shown in Table 1, the policy table contains two rules, represented as the two rows in the table, corresponding to the two cases in the program described above. Every rule has four components: match, test, actions and update. The match component species the packet fields and corresponding values that a packet should match. In this example, no matches need to be specified and * is used to denote the wildcard. The test component is a conjunction of checks, each of which checks whether the state associated with some fields in a state table equals a certain value. For example, the test in the second rule has one check ST(dstmac).state=1, which checks whether the state associated with the dstmac (i.e., destination mac) address of the packet is 1 in ST. The actions component defines the actions that are applied to matched packets. In this example, the action in the first rule floods the matched packet to all ports and the action send(ST(dstmac).value) in the second rule first reads the value (in this case, the port) stored in ST for the dstmac address of the matched packet, and sends the packet to that port. The update component is a sequence of writes, each of which changes the state and value associated with some fields in a state table to certain values. For example, the write ST(srcmac):=(1,port) changes the state associated with the srcmac (i.e., source mac) address of the packet to 1 in ST, and stores the value associated with the srcmac address of the packet to the port of it.

3.3 Interpreter

FIG. 3 depicts pseudocode used by SDN policy interpreter 210 according to an embodiment of the subject matter described herein. SDN policy interpreter 210 may process incoming packets at SDN controller 208 using the policy table. SDN policy interpreter 210 may match each incoming packet against each rule in the policy table in order. A rule is matched, if the packet fields match the match and all checks in the test of the rule are satisfied. The first matched rule applies actions to the packet, and state tables are updated according to the update of the rule. Moreover, system 200 and/or SDN policy interpreter 210 may automatically infer the rules that can be installed on the data plane from the latest configuration of state tables. The corresponding function is update_flowtable in the pseudocode. Policy execution is described in more detail in Section 6.

FIG. 4 depicts an illustrative execution for an incoming packet trace according to an embodiment of the subject matter described herein. Since the purpose of this example is to illustrate how a policy table is executed, it may be assumed that every packet in the packet trace shown in subfigure (a) is processed on SDN controller 208. Initially, all states in the state table ST are 0, and all values are -, meaning unknown, as shown in subfigure (b). The first packet $p_1$ is matched against each rule in Table 1 in order at SDN controller 208. The first matched rule is the first rule, since $p_1$ matches the match (*) and the state of the field dstmac of $p_1$ in ST is 0, satisfying the check (ST(dstmac).state=0) in test of the rule. Therefore, the rule applies the action which instructs the switch to flood $p_1$, and updates the state table as in subfigure (c). The second packet $p_2$ in the trace matches the second rule in the policy table, since the state of its dstmac is 1. The program sends $p_2$ out to port 2, which is stored in the state table associated with MAC address A. Applying the update of the rule, the state table is updated as in subfigure (d). The third packet $p_3$ matches the second rule in the policy table, and the updated state table remain the same and thus not shown here. The last packet $p_4$ suggests that the host with MAC A migrates to port 3, and it matches the second rule in the policy table and gets sent to port 1. Subfigure (e) shows the state table after applying the update.

4. Programming Model

In this section, an exemplary scenario based programming model is discussed. First, an exemplary programming language is defined, which allows the operator to describe example network behaviors in representative scenarios. Second, the policy model is defined, which includes the model of state tables and policy tables. How to generate a policy from scenarios is discussed in the next section.

4.1 Programming Language

FIG. 5 depicts various components of a configuration language for expressing network timing diagrams according to an embodiment described herein. In this configuration language, variables and fields of packets are typed. Examples of base types used include bool, PORT, IP_ADDR (set of IP addresses), MAC_ADDR (set of MAC addresses). A packet-type consists of a list of names of fields of the packet along with their types. In the above example, the packet-type consists of three fields and is given by (port: PORT, srcmac:MAC_ADDR, dstmac:MAC_ADDR).

A (concrete) packet specifies a value for each field of type corresponding to that field. A symbolic value of a type T is either a concrete value of type T, or a variable x of type T. A symbolic packet specifies a symbolic value for each field.

The term Act is used to denote a set of action primitives for processing packets. For the action primitives with parameters, the user can use either concrete values or variables of the corresponding type.

In some embodiments, system 200 and/or related entities may provide or utilize a library that supports standard packet fields and actions such as drop, flood, send(port) (send to a port), modify(f,v) (modify the value of field f to v). System 200 may also support user-defined packet-type using customized field names and types, as well as user-defined actions. One can generalize it by providing handlers for user-defined fields and action primitives.

An event is a pair of a symbolic packet sp and a list of actions $[a_1, \ldots a_l]$, denoted as $sp \rightarrow [a_1, \ldots, a_l]$. A scenario is a finite sequence of events. A scenario based program is a finite set of scenarios.

With the notation, the scenario of FIG. 1 corresponds to:
$P_1, h_1, h_2 \rightarrow$ flood
$P_2, h_3, h_1 \rightarrow$ send$(P_1)$
$P_3, h_2, h_3 \rightarrow$ send$(P_2)$ A scenario is concrete if all the symbolic packets appearing in the scenario and actions have only concrete values. A scenario based program with symbolic scenarios can be viewed as shorthand for a set of concrete scenarios. This set is obtained by replacing each variable by every possible value of the corresponding type with the following requirements. First, a variable can only take values that have not appeared in the scenario based program. Second, if the same variable appears in multiple symbolic packets and actions in the program, then it gets replaced by the same value. Third, different variables in a program get replaced by different values. Thus, the symbolic scenario of FIG. 1 corresponds to $\Pi_{i=0,1,2}$ (n−i)(l−i) concrete scenarios if the type MAC_ADDR and PORT contain n and l distinct values, respectively.

The language itself is simple and can be viewed more as a configuration language rather than a general purpose programming language. A visual tool takes as input scenarios drawn as actual network timing diagrams and generates the configuration.

4.2 Policy Model

A policy consists of a policy table along with state tables that store the history of policy execution.

A state table is a key-value map that maintains states and values for relevant fields. Let $Ti_j$ be some base type appearing in the packet-type, S be a state set with finitely many states, and the packet-type be $(f_1:T_1, \ldots, f_k:T_k)$. A d-dimensional state table ST stores a state in S and a value of type $Ti_{d+1}$, for all keys of type $Ti_1 \times \ldots \times Ti_d$.

The operations allow on a state table may include reads, checks and writes.

Let ST be a state table of type $T_1 \times \ldots \times T_d \to S \times T_{d+1}$, let $f_1, \ldots f_d$ be field names of type $T_1, \ldots, T_d$, respectively. A read of ST indexes some entry in ST, and is of the form $ST(f_1, \ldots, f_d)$. A check of ST checks whether the state associated with some key is a particular state. Syntactically, it is a pair of a read and a state, written as $ST(f_1, \ldots, f_d)$.state=s, where s∈S is a state. In the above example, ST(dstmac).state=0 is a check with the field dstmac. In contrast to a check, a write of a state table changes the state along with the value associated with some key. A write of ST is of the form $ST(f_1, \ldots, f_d):=(sv,fv)$. Here, sv is either a state, or—representing no change. fv is either a concrete value of type $T_{d+1}$,—representing no change, or a field name of type $T_{d+1}$. In the above example, ST(srcmac):=(1,port) is a write of ST with the field srcmac.

The term configurations may be used to indicate the snapshots of state tables. For example, the initial configuration of the state table in the above example maps every MAC address to $(0,\perp)$ as shown in FIG. 4(b). Here, $\perp$ is used to represent the fact that no value is stored. A read $ST(f_1, \ldots, f_d)$ for a packet p at a configuration c returns the state-value pair stored in ST for the key $(p.f_1, \ldots, p.f_d)$ at c. $ST(f_1, \ldots, f_d)$.state and $ST(f_1, \ldots, f_d)$.value is used to denote the state and value in the returned pair. A check $ST(f_1, \ldots, f_d)$.state=s is true for a packet p at a configuration c if the state read from ST at the configuration c is s. In the example in FIG. 4, ST(srcip).state=0 is true for $p_1$ at the initial configuration (subfigure (b)) of ST. A write $ST(f_1, \ldots, f_d):=(sv,fv)$ for a packet p writes the state-value pair to the corresponding entry indexed by the read. Note that if sv(fv, resp.) is -, the write does not write any state(value, resp.) to ST, and if fv specifies a field name, the value of p.fv should be written.

Given a set of state tables $\mathcal{T}$, a rule r based on $\mathcal{T}$ has four components, namely, match, test, actions and update. match is of the form $(f_1=v_1, \ldots, f_k=v_k)$, where $f_i$ is a name of a packet field, and $v_i$ is a concrete value or a wildcard. A packet p matches $(f_1=v_1, \ldots, f_k=v_k)$ iff $v_i$ is a wildcard, or $p.f_i=v_i$ for all i=1 to k. The actions component is a list of actions using action primitives in Act. In the case where an action primitive accepts parameters, the parameters can be concrete values or values read from state tables in $\mathcal{T}$ using reads. The test component is a conjunction of checks and update is a sequence of writes, where each check/write is of some state table in $\mathcal{T}$. As an example, last two rows in Table 1 are two rules. A policy table based on $\mathcal{T}$ is an ordered list of rules, and every rule is based on $\mathcal{T}$.

A configuration C of a policy consists of all the configurations of each state table in $\mathcal{T}$, on which the policy table is based. A packet p matches a rule at a configuration C iff p matches match and every check in test is true for p at the corresponding configuration in C. Suppose the first matched rule for a packet p at a configuration C is r. Then actions of r will be executed on p and every write in update of r will be executed. The execution for packet p may be denoted as $$C \xrightarrow{p/as}_{PT} C_1,$$

with $C^1$ as the new configuration, and as the actions applied to p.

5. Policy Generation

Given a set of scenarios describing a policy, SDN policy synthesizer 204 may first check if there are conflicts among scenarios. After checking for and resolving any conflicts (e.g., via user intervention or automated correction), a policy may be generated that is consistent with the set of scenarios. This section discusses how to generate a policy, consisting of a set of state tables and a policy table, given a set of scenarios without conflicts. In particular, the policy learning problem with regard to which policies SDN policy synthesizer 204 aims to generate is discussed and steps for an exemplary synthesis algorithm is discussed.

5.1 The Policy Learning Problem

First, since the input scenarios describe the behaviors of the desired policy in representative scenarios, the generated policy should be consistent with all the behaviors described in all scenarios.

DEFINITION 1 (CONSISTENCY). Given a concrete scenario $SC=[sp_1 \Rightarrow as_1, \ldots, sp_k \Rightarrow as_k]$, a policy table PT is consistent with SC iff $$C_{i-1} \xrightarrow{p/as_i}_{PT} C_i$$

for $$i = 1, \ldots, k,$$

where $C_0$ is the initial configuration in which every state table maps every key to the initial state 0 and a value of $\perp$. A policy table is consistent with a scenario based program, iff it is consistent with all the concrete scenarios represented by the scenario based program.

As an example, the policy given in Table 1 is consistent with the scenario in FIG. 1. However, the policy depicted in Table 2 below is not consistent with the scenario, since it floods the third packet in the scenario instead of sending it to $P_2$.

In addition to consistency, SDN policy synthesizer 202 may attempt to generate a generalized policy from input scenarios. For this, SDN policy synthesizer 204 may attempt to generate a consistent policy with minimal number of rules.

TABLE 2

| MATCH | TEST | ACTIONS | UPDATE |
|---|---|---|---|
| * | ST(dstmac).state=0 | flood | ST(srcmac):=(1,port) |
| * | ST(dstmac).state=1 | Send(ST(dstmac).value | ST(srcmac):=(—,—) |

To see how this heuristic can help to generate a general policy, consider the 3-rule policy table in Table 3. It can be verified that the policy is consistent with the scenario in FIG. 1. However, this policy overfits the input scenario and will not generalize to a fourth packet such as $(P_1, h_4, h_2)$, because this packet would be flooded by the policy. On the other hand, the desired policy in Table 1 only uses two rules, and can handle the fourth packet mentioned

TABLE 3

| MATCH | TEST | ACTIONS | UPDATE |
|---|---|---|---|
| * | ST(dstmac).state=0 | flood | ST(srcmac):=(1,port) |
| * | ST(dstmac).state=1 | Send(ST(dstmac).value | ST(srcmac):=(2,port) |
| * | ST(dstmac).state=2 | Send(ST(dstmac).value | ST(srcmac):=(—,—) |

A computational problem for generating appropriated policies may be summarized as the following policy learning problem.

Given scenarios $SC_1, \ldots, SC_n$, the policy learning problem seeks a set of state tables T and a policy table PT based on T, such that (1) PT is consistent with all scenarios $SC_i$. (2) PT has the smallest number of rules among all consistent policy tables.

A simple reduction from DFA learning problem [7] shows the following theorem.

THEOREM 1. The policy learning problem is NP-hard.

In the following sections, an exemplary synthesis algorithm is broken down into steps, where each step is discussed separately.

5.2 Policies without Tests

First, consider the simplest case where the desired policy table does not have tests. In this case, each rule in the policy table only consists of a match and actions. Thus, it suffices to generate an ordered list of matches, together with the corresponding list of actions.

We first describe the algorithm which generates a list of matches from the input scenarios, shown in Algorithm 1. As defined in an exemplary scenario based programming model, a symbolic packet represents a set of concrete packets, which is obtained by replacing symbolic values by concrete field values. Therefore, Algorithm 1 generates a match for each symbolic packet in the scenarios, by replacing symbolic values by * (line 3). Moreover, to ensure that the generated match does not mismatch unrepresented packets, the algorithm inserts the generated match to the list, such that no match under it is completely covered (line 4). Note that for two generated matches which are overlapping with each other, either one can be ordered above the other. This is explained through an example later in this subsection.

---
Algorithm 1 generate ordered match_list([$SC_i$])
---
1: L = ∅
2: for all packet sp = ($f_i$=$v_i$) in every scenario $SC_i$ do
3:    let m = ($f_i$ =$m_i$), where $m_i$ = $v_i$ if $v_i$ is a concrete value else *
4:    insert m to L
5: end for
6: return L With the ordered list of matches, it is straightforward to search for the actions for every match in the list: the first matched match in the list for each symbolic packet can be searched and consistency between the actions with the packet and actions with the match can be checked. If actions for the match are not set, the actions for the match can be set to the actions associate with the symbolic packet. A consistent policy table is returned when all actions in every symbolic event are consistent.

FIGS. 6A and 6B depict a scenario and a policy table according to an embodiment described herein. In FIG. 6A, a scenario describing a firewall is shown where a symbolic packet is expressed by (srcip,dstip). The generated policy table is shown in FIG. 6B. The match column of the policy table is generated by Algorithm 1. It should be noted that if the second rule is swapped with the third rule in the policy table, the resulted policy table is still consistent with the scenario. The reason is that by definition the variables ip1 and ip2 only represent values other than A, B, C. Thus, the packet (A, B) is not represented by any symbolic packets in the scenario.

5.3 Policies with Tests

Now consider synthesizing policies that use tests. As an example, consider the scenario for the learning switch in FIG. 1. One can verify that a consistent policy table for the scenario requires tests. In fact, the only match in the match list generated by Algorithm 1 is (*), and every packet in the scenario matches it. However, their actions differ from each other. Therefore, in addition to the only match (*), a consistent policy table must have tests. In this subsection, it is assumed that all tests that are used in the policy table are given, and show the algorithm to synthesize the policy. This assumption is relaxed in the next subsection.

Suppose the tests used in the policy for learning switch are ST(dstmac)=0 and ST(dstmac)=1. Composing the match and test, the policy table has the form as shown in Table 4.

TABLE 4

| MATCH | TEST | ACTIONS | UPDATE |
|---|---|---|---|
| * | ST(dstmac)=0 | $ax_2$ | ST(srcmac):=($sx_1$,$ux_1$)<br>ST(dstmac):=($sx_2$,$ux_2$) |
| * | ST(dstmac)=1 | $ax_2$ | ST(srcmac):=($sx_3$,$ux_3$)<br>ST(dstmac):=($sx_4$,$ux_4$) |

Table 4 is a symbolic representation of policy tables. It represents actions and update in rules using variables. A symbolic representation may be referred to as policy table sketches (or sketches in short). In this sketch, all possible writes in update are derived from the state tables that are used in each rule's tests. In this example, since the only state table accepts keys of type MAC_ADDR, the state table can be updated using either srcmac or the dstmac of a packet. Therefore, there are two writes per rule in its update, and sx's range over all states (in this example, {0,1}) plus a special symbol - meaning no update, and ux's range over all field names plus a special symbol -. For ease of presentation, potential overwrittings may be ignored due to the two writes in each rule's update. In practice, other orders of writes may be considered as well. Variables ax's are used to represent possible actions for each rule. In this example, ax's can range from {flood, send(ST(srcmac)), send(ST(dstmac))}, which are obtained from actions appearing in the scenario. To distinguish variables appearing in sketches from variables appearing in the scenarios, variables appearing in a sketch are referred to as sketch variables.

Algorithm 2 shows the algorithm of generating sketches given the match list L and tests. The set C contains all possible reads to the state tables appearing in TESTS (line 1-line 4), and this set is used to derive writes in each rule (line 7). The sketch is generated by composing each match and test in TESTS (line 5-line 6), and every rule has all possible writes derived from reads in C (line 7).

---
Algorithm 2 generate sketch(L, TESTS)
---
1: let C = Ø
2: for all state table ST appearing in TESTS do
3:   add all reads $ST(f_1,...,f_k)$ to C, where $f_i$ is a field name of the corresponding type.
4: end for
5: for all match m in L in order do
6:   for all test t in TESTS do
7:     construct a rule r = (match, test, ax, update), where ax is a new variable for actions, and update = $[read_i:=(sx_i,ux_i)], \forall read_i \in C$, $sx_i, ux_i$ fresh variables.
8:     add rule r to sketch
9:   end for
10: end for
---

Using the sketch, concrete values can be searched for sketch variables, with the goal that the obtained policy table is consistent with all scenarios. To search for a consistent policy table, a simple backtracking search algorithm may be performed over all sketch variables. The algorithm is shown in Algorithm 3.

---
Algorithm 3 search_sketch($[SC_i]$, sketch)
---
1: stack = [ ]
2: for all scenarios $SC_i$ do
3:   for all events $e_j$ in $SC_i$ do
4:     let r be the first matching rule
5:     initialize actions of r and push the sketch variable to stack, if r's actions are not set
6:     if actions of $r_i$ are consistent then
7:       initialize any sketch variables in r's update and push them to stack, if they are not assigned values yet
8:       apply update of r
9:     else
10:      backtrack(stack)
11:      return FAILED if stack is empty else restart from line 2
12:    end if
13:  end for
14: end for
15: return sketch
---

The algorithm maintains a stack of sketch variables together with the values assigned to them. Whenever a sketch variable is assigned a value, it ensures that the sketch variable is pushed to the stack (line 5, 7). For each symbolic event in every scenario, the algorithm checks consistency of the first matching rule's actions (line 6). Whenever inconsistency encountered (line 9), it performs standard backtracking procedure on the stack (line 10-11); and when it is consistent, the algorithm execute the update of the rule (line 8) and carry on to the next symbolic event.

5.4 Putting it Together

The overall synthesis algorithm (Algorithm 4) is described below using the procedures described in previous subsections. At a high level, the synthesis algorithm enumerates sketches by increasing the number of rules, in order to generate a consistent policy table using as few rules as possible. For each sketch, it invokes Algorithm 3 to search for a consistent policy using the sketch.

---
Algorithm 4 synthesize($\{SC_i\}$)
---
1: L = generate ordered match list($[SC_i]$)
2: let A contain all possible reads
---

---
Algorithm 4 synthesize($\{SC_i\}$)
---
3: for all (c, m) with ascending order of $m^c$ do
4:   for all subset B ⊂ A with size c do
5:     TESTS = $\{\Lambda_i\ readi.\ state = v_i | \forall read_i \in B, \forall v_i \in [0, ..., m-1]\}$
6:     generate_sketch(L, TESTS)
7:     if search_sketch(sketch) returns a consistent policy table then
8:       return the policy table
9:     end if
10:  end for
11: end for
---

The learning switch example in FIG. 1 may be used to illustrate how Algorithm 4 works. For the scenario in FIG. 1, the set A contains $2^3=8$ possible reads, each of which corresponds to a combination of field names, and a state table with the corresponding type. Because two state tables with the same type can be merged into a single state table with larger states, we only construct one state table per type. Then the algorithm constructs a sketch, where each rule has c checks, and its state ranges from 0 to m−1. Thus the generated sketch has $m^c|L|$ rules. Note that, when m is 1 or c is 0, the generated sketch does not use tests essentially, hence enumeration of the pair (c, m) can start from (1, 2). When picking reads from A (line 4), we pick reads with high dimension first. As an example for the learning switch, the first generated set B with size 1 in line 4 is [ST(port,srcmac, dstmac)], followed by other reads with dimension two.

5.5 Additional Heuristics

In addition to the basic synthesis algorithm described above, SDN policy synthesizer 204 may implement other heuristics.

Algorithm 3 initializes sketch variables and pushes them to the stack as soon as applying update of the matching rule. This eager initialization could push irrelevant sketch variables to the stack and increase the search depth. For example, the variables $sx_2$, $ux_2$ in Table 4 are not used when checking consistency for any symbolic packet in FIG. 1, and hence irrelevant to the consistency checking. Thus, the synthesizer takes a lazy initialization heuristic. That is, only when an uninitialized sketch variable is read from state tables, the synthesis algorithm initializes it and pushes it to the stack.

After synthesizing a consistent policy, the synthesizer applies additional post processing to the policy table in order to simplify the policy table. These include:

(1) If a rule in the policy table is not matched by any symbolic packet in the input scenarios, this rule can be removed;

(2) The synthesizer removes writes in each rule's update, if they do not change the state table;

(3) When multiple rules can be merged into one without causing inconsistency, the synthesizer will merge these rules.

6. Policy Execution

Given the synthesized policy, system 200 may use the interpreter to process packets on SDN controller 208. As described in Section 3.3, the interpreter simply iterates through all rules in the policy table and picks the first matched rule for the incoming packet. Then it updates all state tables based on the update of the matched rule, and instructs the switch to apply the action of the rule to the packet.

While processing packets on SDN controller 208 is sufficient for executing the policy, it is not practically efficient and degrades the performance of the network. In this section, we show how the tool infers flow table rules which can be installed onto switches, thus reducing the overhead of controller and delay of packet delivery.

One observation may be summarized by the following theorem.

THEOREM 2. A packet can be handled on switches if and only if handling this packet on SDN controller 208 does not change any state tables.

Indeed, if a packet p is handled on switches, SDN controller 208 will not be aware of the packet and thus the state tables remain unchanged. On the other hand, if p is sent to SDN controller 208 for execution and the updated state tables remain the same as before, we know handling p on switches would not affects future packets execution. Therefore, it is sufficient and necessary to install rules on switches for the packets whose execution will not change current configuration of state tables.

Based on this observation, we have implemented a reactive installation approach which installs flow table rules that only match necessary fields. Moreover, to keep the installed rules up to date, we update installed rules when the policy configuration changes, and remove invalid rules on switches. Note that, one can also infer flow table rules in a proactive way based on this observation. Implementation of proactive approaches may be further explored in future work.

---

Algorithm 5 update_flowtable(p)

1: let rule r be the matched rule for p in the policy table
2: if r does not update state tables, or the updated state tables remain unchanged then
3:     match ← ($f_{i_1}$ = p.$f_{i_1}$,...,$f_{i_k}$), for all field $f_{ij}$ appearing in the policy table
4:     add match → r.actions to the flow table, if the actions $a_j$ applied to p by r is supported by the switch
5: end if
6: for all installed rule match' → [$a'_1$,...,$a'_l$] in the flow table do
7:     let p' be a packet matches match'
8:     let rule r be the matched rule in the policy table for p'
9:     if r does not update state tables or the updated state tables remain unchanged then
10:         update the installed rule to match' → r.actions, if the actions $a_j$ applied to p by r is supported by the switch
11:     else
12:         remove the installed rule from the flow table
13: end if
14: end for

---

Algorithm 5 shows the installation strategy. First the algorithm checks whether the matched rule r for p will change the configuration of state tables. The rule r will not change the configuration, if r does not have writes, or the updated states and values remain the same as the old ones (line 2). If executing p would not change the configuration, the algorithm installs a flow table rule match→[$a_1$, . . . , $a_l$] onto the switch, where match specifies the values for fields related to the policy, and $a_j$'s are the actions that should be applied to p (lines 3-4). The algorithm also needs to check whether previously installed rules are still correct. For this, the algorithm repeats a similar process for each installed rule (lines 6-14).

Revisiting the example depicted in FIG. 4 and using the interpreter algorithm depicted in FIG. 3, the first packet is processed on SDN controller 208, and the state table is updated to the one shown in subfigure (c). Applying Algorithm 5, the matching rule r for $p_1$ would be the first rule in the policy table shown in Table 1. Since port 2 is already remembered for the srcmac A, r would not change the state table. Therefore, a flow table rule $fr_1$=(port=2,srcmac=A, dstmac=B)→flood, which matches the port, srcmac and dstmac of $p_1$ is pushed down to the switch. After processing the second packet $p_2$, the state table is updated as in subfigure (d) and a flow table rule matching $p_2$ can be pushed down. Moreover, the algorithm checks the installed flow table rule $fr_1$. Since now $p_1$ would match the second rule in the policy table, and the applied action to $p_1$ is different from the installed flow table rule, thus the action of $fr_1$ is updated to send(1).

7. Use Cases

In this section, scenario based programming is described for four policies. For each policy, the packet-type, the scenarios that can be used to synthesize the desired policy, and the policy table generated from the scenarios are described. To this end, we manually validate that the synthesized policy is the correct policy. One can also formally verify the correctness of generated policy against logical specifications using control plane verification tools such as Vericon [3] and Nice [5].

7.1 Learning Switch

First, the learning switch example from section 2 is revisited. Recall that the learning switch application is programmed for a single switch using a scenario in FIG. 1. Now we show how to adapt the scenario to program the learning switch for a network. That is, the policy needs to maintain the port of each switch for hosts. To program this policy, we need a field specifying which switch the packet is located. Therefore, the packet-type used is as follows: (switch:SWITCH, port:PORT, srcmac:MACADDR, dstmac:MACADDR).

FIG. 7 depicts a scenario for a learning switch according to an embodiment described herein. In FIG. 7, the switch field is added to each symbolic packet in the scenario in FIG. 1. This modified scenario suffices for SDN policy synthesizer 204 to synthesize the network-wide learning switch policy. The scenario is shown in FIG. 7 and the synthesized policy table is shown in Table 5.

TABLE 5

| MATCH | TEST | ACTIONS | UPDATE |
|---|---|---|---|
| * | ST(switch, dstmac).state=0 | flood | ST(switch,srcmac) :=(1, port) |
| * | ST(switch, dstmac).state=1 | send(ST(switch, dstmac). value) | ST(switch, srcmac):=(1, port) |

7.2 Stateful Firewall

Now, we show how to use scenarios to program stateful firewall policies inductively.

First, consider a stateful firewall which protects hosts connecting to port 1 by blocking untrusted traffic from port 2. The firewall should allow all outbound packets from port 1, and only allow inbound packets from port 2 if the sender of the packet has received packets from the receiver before. For this policy, the packet-type used is as follows: (port: PORT, srcip:IPADDR, dstip:IPADDR). We start by giving two of the most intuitive scenarios shown in FIG. 8.

FIG. 8 depicts two scenarios for a first stateful firewall according to an embodiment described herein. In the first scenario, the switch blocks the traffic from port 2, and the second scenario demonstrates the case where the firewall allows the traffic from port 2. It turns out that these two scenarios are sufficient to generate the desired policy for the first stateful firewall, shown in Table 6.

TABLE 6

| MATCH | TEST | ACTIONS | UPDATE |
|---|---|---|---|
| port=1 | True | send(2) | ST(dstip,srcip):=(1, —) |
| port=2 | ST(srcip,dstip).state=0 | drop | — |
| port=2 | ST(srcip,dstip).state=1 | send(1) | — |

FIG. 9 depicts a modified scenario for a second stateful firewall according to an embodiment described herein. In FIG. 9, scenarios from FIG. 8 are adapted to change the dstip of the second packet in scenario 2. Hence, the policy for the scenarios of FIG. 9 may be specified such that it allows inbound traffic if the sender has received packets from any protected hosts before. One may notice that the policy should maintain a state for each host, instead of a pair of hosts. The synthesized policy for the second stateful firewall maintains a 1-dimension state table, and is shown in Table 7.

TABLE 7

| MATCH | TEST | ACTIONS | UPDATE |
|---|---|---|---|
| port=1 | True | send(2) | ST(dstip):=(1, —) |
| port=2 | ST(srcip).state=0 | drop | — |
| port=2 | ST(srcip).state=1 | send(1) | — |

While we mostly focus on packetin events, system 200 can be generalized to handle arbitrary events. In this use case, it is demonstrated how to use fields in symbolic packets to handle user-defined network events. Suppose we want to further implement a policy such that inbound traffic is allowed until a timeout event indicates the sender expires. For the policy, we need to handle a timeout event, and the expired host ip specified in the event. We can use a packet-type (event:EVENT, eventip:IPADDR, srcip:IPADDR, dstip:IPADDR). Here, the field named event specifies the type of the network event, and the field named eventip specifies the expired host. These two fields are set by the corresponding field handlers. For this policy, we can add one more scenario exhibiting the behavior of timeout, as in FIG. 10.

FIG. 10 depicts an added scenario for a third stateful firewall according to an embodiment described herein. In FIG. 10, the first symbolic packet is similar as above, but since this is a packetin event, its eventip field is not applicable (the character - is used to denote its value). The second symbolic packet is the timeout event, which specifies host $h_2$ is expired. Since SDN controller 208 does not need to apply any actions to this event, nop is used for its action. The third packet from host $h_2$ now gets dropped. Scenario 1 and Scenario 2 can be adapted similarly from FIG. 8 and FIG. 9 respectively.

Given the three scenarios, the desired policy can be synthesized, as in Table 8.

TABLE 8

| MATCH | TEST | ACTIONS | UPDATE |
|---|---|---|---|
| event=packetin,port=1 | True | send(2) | ST(dstip):=(1, —) |
| event=packetin,port=2 | ST(srcip).state=0 | drop | — |

TABLE 8-continued

| MATCH | TEST | ACTIONS | UPDATE |
|---|---|---|---|
| event=packetin,port=2 | ST(srcip).state=1 | send(1) | — |
| event=timeout | True | nop | ST(eventip):=(0,—) |

7.3 TCP Firewall

FIG. 11 depicts a scenario for a transmission control protocol (TCP) firewall according to an embodiment described herein. In this use case, we show using scenarios to program the TCP firewall example that tracks the state transition of TCP handshake protocol, and only allows packets that follow the protocol. We use the packet-type that contains 5 tuples: (flag:TCP_FLAG, srcip:IP_ADDR, dstip:IP_ADDR, srcport:TCP_PORT, dstport:TCP_PORT).

We first specify two scenarios describing two allowed packet traces by the TCP firewall in FIG. 11. A trivial policy which allows all packets would be generated. Next, we add two scenarios describing packets which should be denied by the firewall. Checking the policy, we find an undesired behavior of the generated policy, which allows the second packet in scenario 5. We add the correct behavior as in scenario 5, and the synthesizer generates the desired policy. The generated policy table for the TCP firewall is shown in Table 9, and the state table maintains states for each tuple of srcip, dstip, srcport, and dstport.

TABLE 9

| MATCH | TEST | ACTIONS | UPDATE |
|---|---|---|---|
| flag=SYN | True | allow | ST(dstip,dstport, srcip,srcport):=(1,—) |
| flag=SYNACK | ST(srcip, srcport, dstip, dstport).state=0 | deny | — |
| flag=SYNACK | ST(srcip, srcport, dstip, dstport).state=1 | allow | ST(dstip,dstport, srcip,srcport):=(1,—) |
| flag=ACK | ST(srcip, srcport, dstip, dstport).state=0 | deny | — |
| flag=ACK | ST(srcip, srcport, dstip, dstport).state=1 | allow | — |

7.4 ARP Proxy

FIG. 12 depicts a scenario for an address resolution protocol (ARP) proxy according to an embodiment described herein. In this use case, we show using user-defined action primitives to program the ARP proxy in scenarios. An ARP proxy caches MAC addresses associated with IP addresses, and responses ARP requests when the requested MAC is known.

To specify this use case, the packet-type used is as follows: (srcmac:MAC_ADDR, arpop:ARP_OP, srcip:IP_ADDR, dstip:IP_ADDR). The first scenario we provide is similar to the scenario for the learning switch example. In addition, we provide another scenario which describes learning srcmac from ARP reply messages. Note that in the scenarios, the user-defined action primitive reply is used, which should construct an ARP reply message with the requested MAC address.

TABLE 10

| MATCH | TEST | ACTIONS | UPDATE |
|---|---|---|---|
| Arpop =request | ST(dstip).state=0 | flood | ST(srcip):=(1,srcmac) |
| arpop =request | ST(dstip).state=1 | reply(ST(dstip).value) | ST(srcip):=(1,srcmac) |
| arpop =reply | True | flood | ST(srcip):=(1,srcmac) |

8. Evaluation

We have developed a prototype of system 200 written in Python. We evaluate system 200 along two dimensions: (1) the feasibility of the system 200 in its ability to implement a range of SDN policies [3, 17, 12], (2) we examine the performance and overhead of the synthesized policies, and finally, (3) correctness of the flow table rule installation strategy.

8.1 Feasibility

We explore two aspects of feasibility of system 200. First, is the policy generation process efficient in terms of execution time? Second, is system 200 easy to use, in terms of the number of input scenarios required and lines of configuration code?

Table 11 shows findings for network policies generated from various scenarios in terms of execution time and scenario size. Table 11 includes the total number of events in the scenarios (#EV) used to generate each policy, the number of scenarios (#SC), and the running time (Time) for generating the policy. We also report the computation time of the synthesizer to generate the policy from scenarios.

TABLE 11

| | #EV | #SC | Time |
|---|---|---|---|
| maclearner1 | 3 | 1 | 11 ms |
| maclearner2 | 3 | 1 | 15 ms |
| auth | 3 | 2 | 13 ms |
| gardenwall | 5 | 3 | 52 ms |
| ids | 3 | 2 | 15 ms |
| monitor | 3 | 2 | 13 ms |
| ratelimiter | 10 | 5 | 147 ms |
| serverlb | 7 | 3 | 143 ms |
| stateful firewall1 | 3 | 2 | 12 ms |
| stateful firewall2 | 3 | 2 | 16 ms |
| stateful firewall3 | 6 | 3 | 107 ms |
| trafficlb | 7 | 3 | 402 ms |
| ucap | 3 | 2 | 13 ms |
| vmprov | 3 | 2 | 24 ms |
| TCP firewall | 9 | 5 | 64 ms |
| ARP proxy | 5 | 2 | 49 ms |

We make the observation that most of the scenarios are expressed in less than 5 events, with some outliers requiring up to 10 events. As shown in Table 11, system 200 is also efficient and requires no more than 402 milliseconds (ms).

We further perform a "code size" comparison, by counting the number of lines in each of the example configurations, and compare with corresponding policies that we implemented in Pyretic and POX. Table 12 summarizes the results. We observe that system 200 is more concise, achieving a 4× and 10× reduction in code size compared with Pyretic and POX.

TABLE 12

| | EXEMPLARY SYSTEM | Pyretic | POX |
|---|---|---|---|
| Mac learner2 | 3 | 17 | 29 |
| Stateful firewall1 | 3 | 21 | 58 |
| TCP firewall | 9 | 24 | 68 |

Table 12 shows the number of events or lines of code to implement policies in different programming abstractions. In particular, Table 11 shows the total number of events in scenarios for system 200 and the lines of code for Pyretic and POX implementations.

8.2 Performance Overhead

System 200 uses the policy table as the policy abstraction, and a generic interpreter to execute the policy table. Unlike handcrafted implementations which can be customized to policies, generic execution of policy abstractions may incur additional overhead. We evaluate the generic execution engine of system 200 using a combination of targeted benchmarks and end-to-end evaluation.

8.2.1 Cbench Evaluation

We first use the Cbench [18] tool to evaluate the response time of three policy implementations.

We emulate one switch in Cbench, which sends one packetin request to SDN controller 208 as soon as it receives a reply for last sent request. The response time corresponds to the time between sending out a request and receiving its reply, which hence includes the execution time of policy implementations. For comparison, we also evaluate the policies' implementations in POX.

Figure 13:
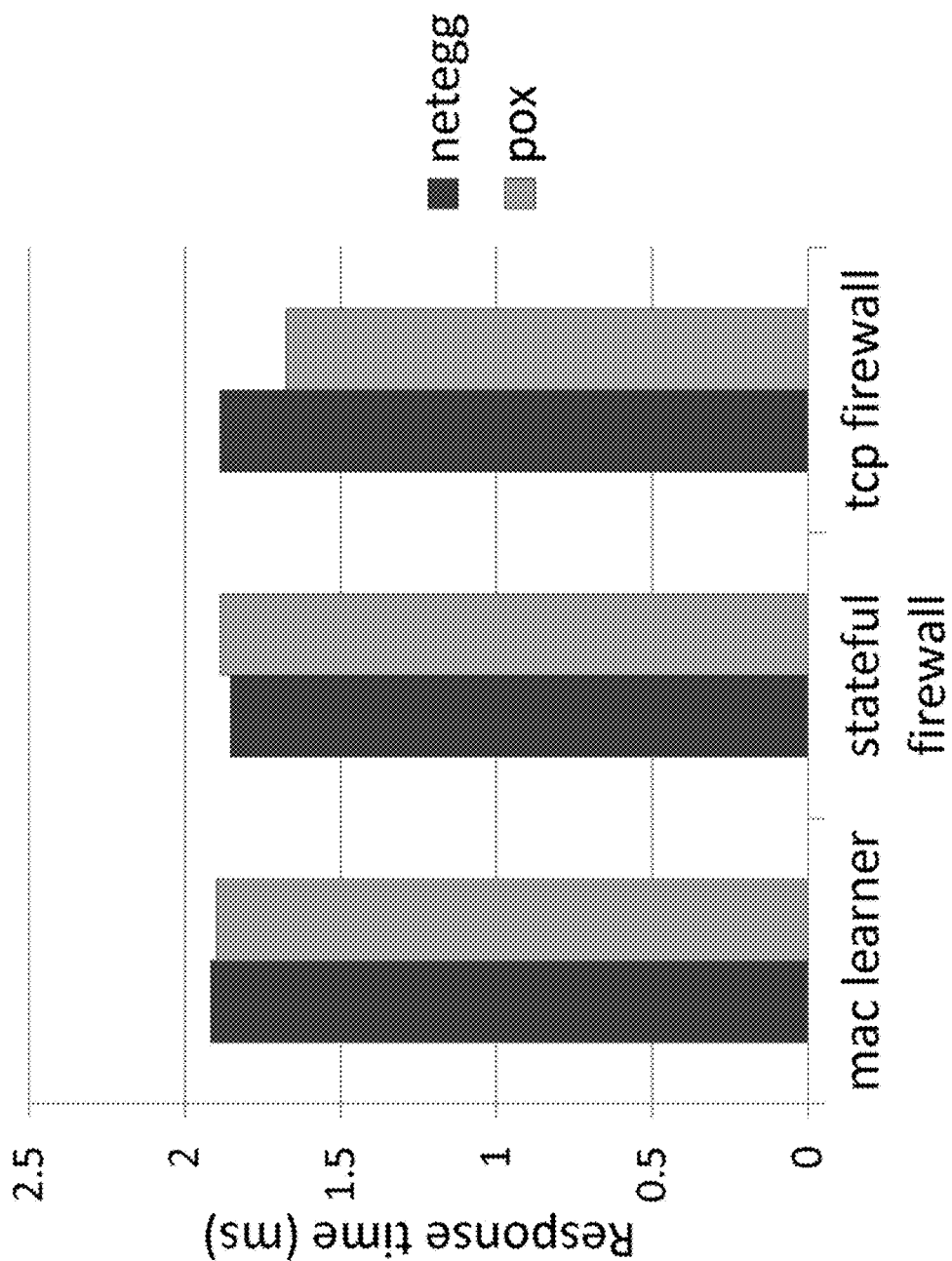
FIG. 13 is a bar graph depicting response time for POX and an exemplary system according to an embodiment described herein.

FIG. 13 is a bar graph depicting response time for POX and an exemplary system according to an embodiment described herein. In the cases shown in FIG. 13, the differences in response times between the POX and system 200 versions are within 12%. In the case of MAC learning and stateful firewall, the differences are negligible (<1%). We observe that the response time between implementations in POX and system 200 are comparable, which suggest that policy abstractions incur reasonably small overhead on execution.

8.2.2 End-to-End Performance

A next set of experiments aims to validate that the synthesized implementation closely matches the handcrafted implementation on end-to-end performance for network applications such as HTTP.

We emulate a fattree topology [1] in Mininet, which consists of 20 switches and 16 hosts. We setup a HTTP server on one host, and run httperf on all other hosts as clients. Httperf sends HTTP requests from the clients to the server, and measures the HTTP connection time for each request, which is the time between a TCP connection being initiated and being closed. We run httperf with different rates of sending requests, and the same number of connections (e.g., at rate 5 request/second, httperf issues 5 requests per client). Each run starts from the initial network state. On SDN controller 208 side, we run the MAC learner policy using two implementations: POX and system 200.

Figure 14:
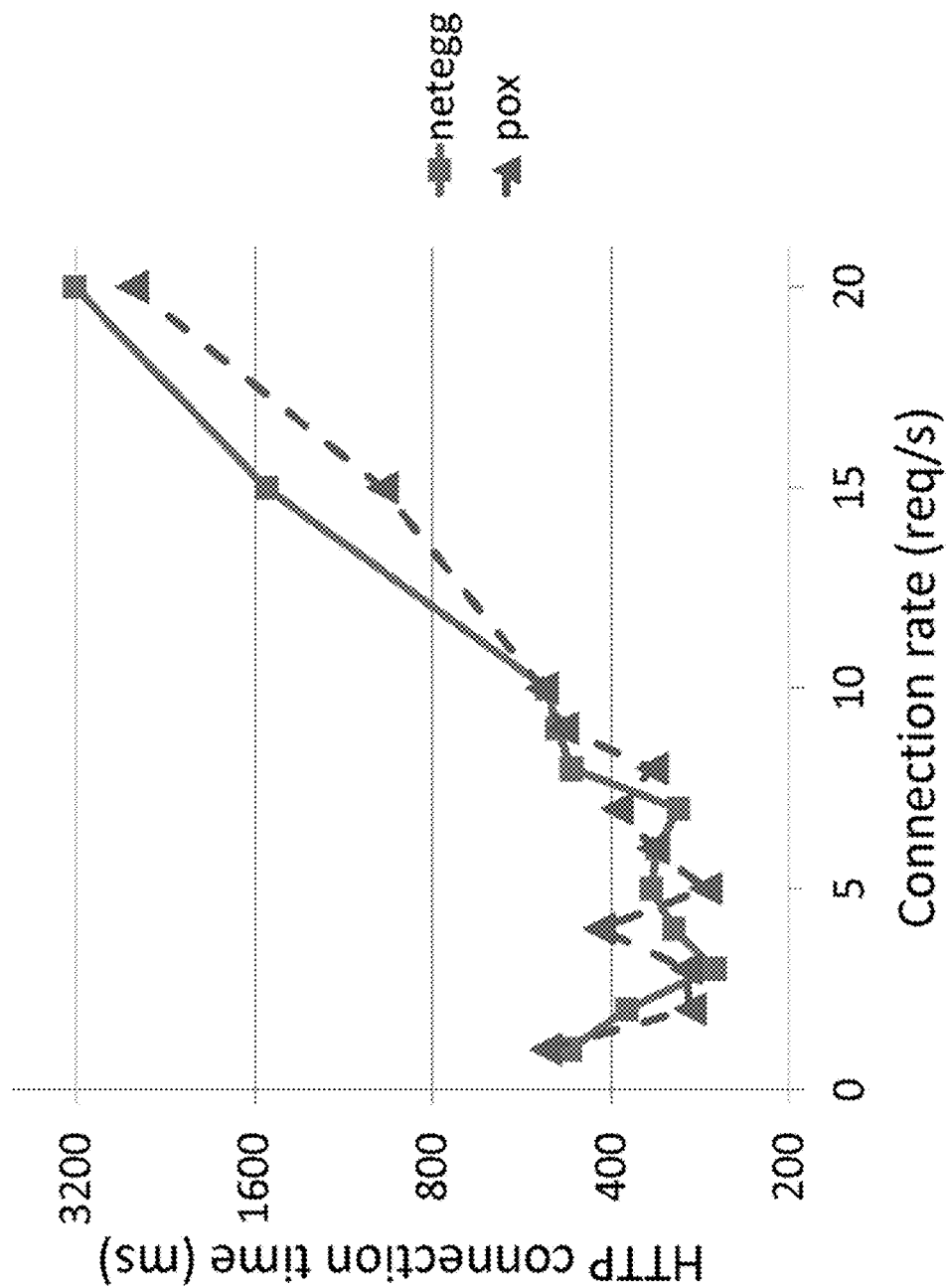
FIG. 14 is a line graph depicting hypertext transfer protocol (HTTP) connection time for POX and an exemplary system according to an embodiment described herein.

FIG. 14 is a line graph depicting hypertext transfer protocol (HTTP) connection time for POX and an exemplary system according to an embodiment described herein. FIG. 14 reports the average connection time over all 15 clients. The x-axis is the rate of HTTP requests issued by the clients. As expected, the connection time under system 200's implementation matches closely to that under handcrafted POX implementation. These results indicate that synthesized implementation is able to achieve comparable end-to-end performance as handcrafted implementations. This also further verifies that execution of a policy abstraction incurs small overhead, and that flow table rule installation is efficient.

8.3 Correctness

To achieve realistic performance, SDN policy interpreter 204 may infer and install flow table rules. We validate the correctness of an exemplary rule installation strategy using emulation based experiments.

We run the synthesized MAC learner policy on SDN controller 208, and emulate a simple topology with a single switch connected with 300 hosts in Mininet [13]. We partition these hosts into two groups, with 150 hosts per group. Every host in a group sends 100 ping messages to another host in the other group with 1 message per second. For comparison, we run the set of experiments using two settings, one with flow table installation and one without.

Figure 15:
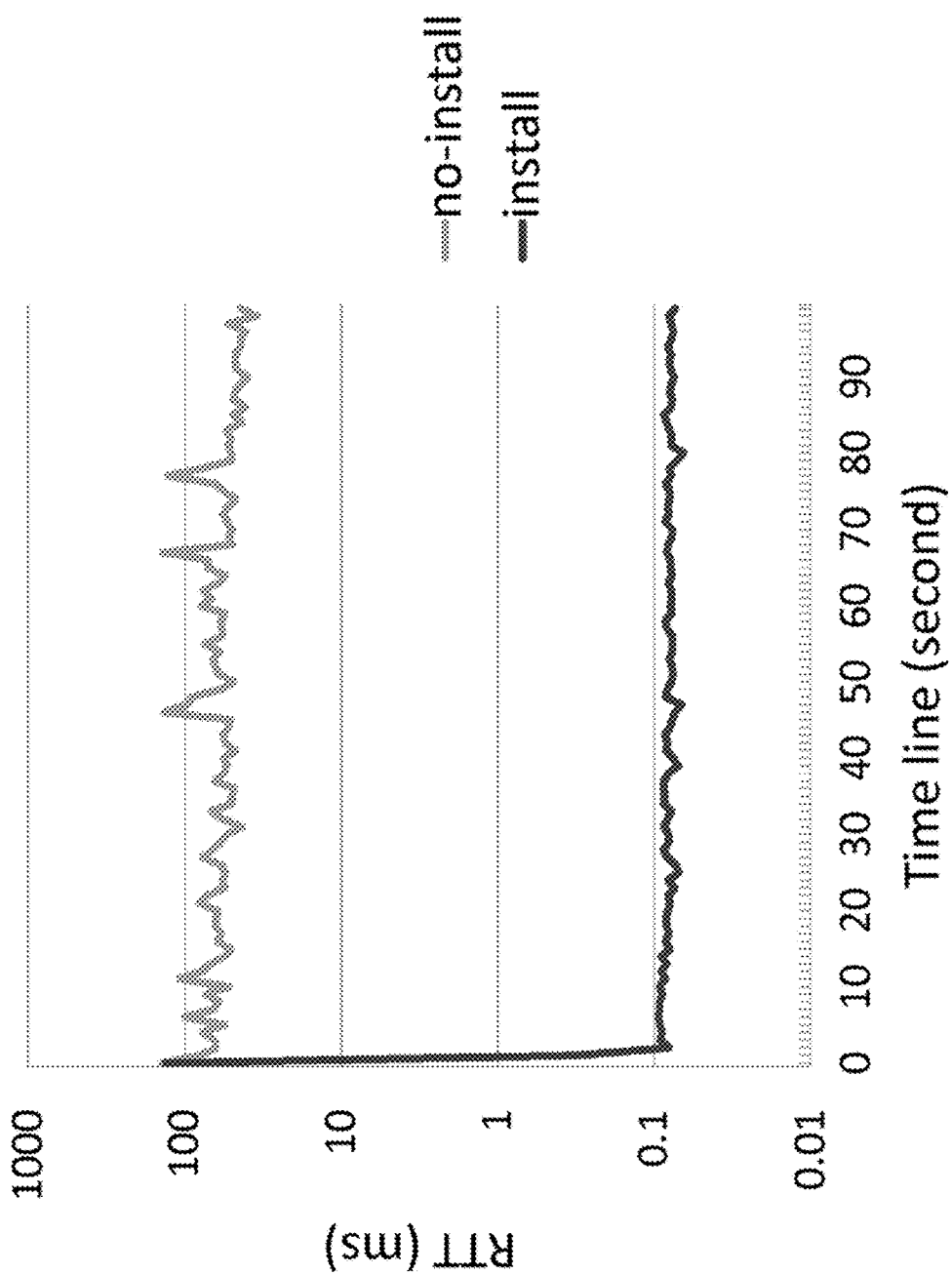
FIG. 15 is a line graph depicting effects of flow table rule installation according to an embodiment described herein.

FIG. 15 is a line graph depicting effects of flow table rule installation according to an embodiment described herein. We plot the average RTT for all ping messages over time in FIG. 15. The red line corresponds to the policy implementation without installing flow table rules. This implementation has a high RTT consistently over time, due to the fact that every packet is sent to SDN controller 208. The blue line corresponds to the case with installation. We observe that only the first message experiences high latency, and subsequent messages has significantly smaller RTT below 0.1 ms. This information suggests that the utilized installation strategy is able to infer flow table rules from the first incoming packet-in event, and correctly install the rules onto the switch. Hence, subsequent packets are all processed by the switch.

Figure 16:
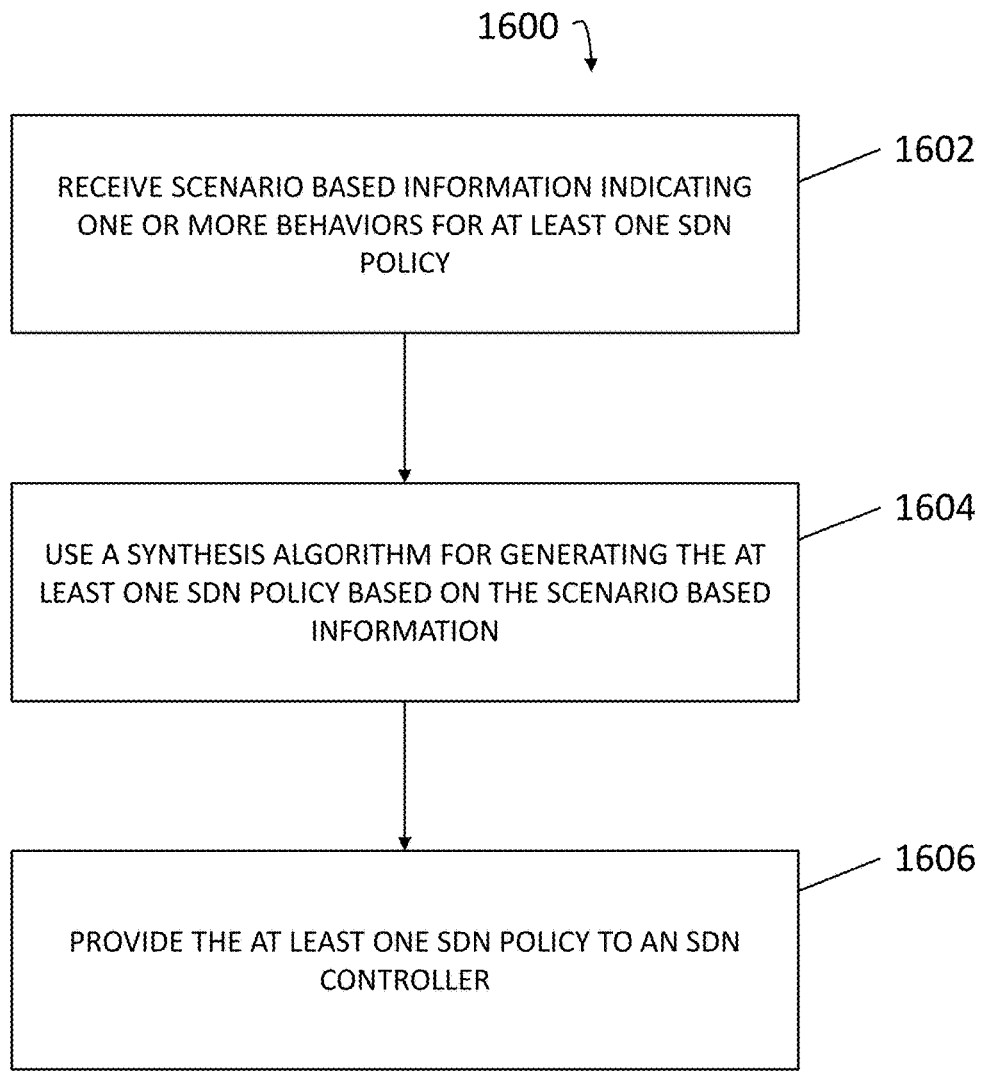
FIG. 16 is a flow chart illustrating an exemplary process for generating SDN policies according to an embodiment of the subject matter described herein.

FIG. 16 is a flow chart illustrating an exemplary process for generating SDN policies according to an embodiment of the subject matter described herein. In some embodiments, process 1600, or portions thereof (e.g., steps 1602, 1604 and/or 1606), may be performed by or at system 200, SDN policy synthesizer 204, SDN policy interpreter 210, and/or another node or module.

Referring to process 1600, in step 1602, scenario based information indicating one or more behaviors for at least one SDN policy may be received. In some embodiments, scenario based information includes one or more timing diagrams. For example, a timing diagram may be provided using various programming languages to express communications protocols and/or communications interfaces.

In some embodiments, receiving scenario based information indicating one or more behaviors for at least one SDN policy may include identifying conflicts associated with the scenario based information. For example, SDN policy synthesizer 204 may identify conflicts (e.g., inconsistencies) associated with one or more received timing diagrams and may notify user 202. In this example, user 202 may resolve the conflicts so that SDN policy synthesizer 204 may generate appropriate policies. In another example, SDN policy synthesizer 204 may identify conflicts associated with one or more received timing diagrams and may resolve the conflicts using predetermined conflict resolution rules or logic. In another example, SDN policy synthesizer 204 may identify conflicts associated with one or more received timing diagrams and may resolve the conflicts by ignoring or discarding one or more conflicting timing diagrams.

At step 1604, a synthesis algorithm may be used for generating the at least one SDN policy based on the scenario based information. For example, a synthesis algorithm may generate a policy that is consistent with a set of timing diagrams.

In some embodiments, at least one SDN policy includes at least one policy rule and at least one state information rule.

In some embodiments, at least one SDN policy is consistent with the scenario based information and has the smallest number of rules among SDN policies that are consistent with the scenario based information.

At step 1606, the at least one SDN policy may be provided to an SDN controller. For example, SDN controller 208 and/or SDN policy interpreter 210 therein may receive an SDN policy and may execute the SDN policy.

In some embodiments, providing at least one SDN policy to SDN controller 208 may include interpreting, by SDN policy interpreter 210 and at the SDN controller 208, the at least one SDN policy and performing at least one action.

In some embodiments, at least one action performed by SDN controller 208 and/or SDN policy interpreter 210 may include executing at least one SDN policy, processing packets at SDN controller 208, instructing a network node, or installing a rule at a network node.

In some embodiments, a network node may include a switch, a router, a learning switch, a deep packet inspection (DPI) node, a firewall, a stateful firewall, a TCP firewall, or an ARP proxy.

It will be appreciated that process 1600 is for illustrative purposes and that different and/or additional actions may be used. It will also be appreciated that various actions described herein may occur in a different order or sequence.

It should be noted that system 200, SDN policy synthesizer 204, SDN policy interpreter 210, and/or functionality described herein may constitute a special purpose computing device. Further, system 200, SDN policy synthesizer 204, SDN policy interpreter 210, and/or functionality described herein can improve the technological field of computer network configuration by providing an efficient solution for generating network policies using examples or scenarios.

9. Related Work

This work builds upon an earlier position paper [21] in several significant ways and is an extension of the earlier simplified model in the position paper. We have added new extensions that automatically push flow table rules from the synthesized policies to the data plane. Moreover, we have developed a complete prototype, added several use cases and experiments to validate system 200.

SDN domain-specific languages [6, 16, 20, 15, 2] make programming policies easier using high level abstractions. This approach is different—we target at designing intuitive abstractions for network operators who can take advantages of their domain expertise and generates examples for system 200.

The present subject matter herein is motivated by related work in the formal methods community in programming by examples. [10, 9, 11] implement finite-state reactive controllers from specification of behaviors. [8] generates string transformation macros in Excel from input/output string examples. [19] uses both symbolic and concrete example to synthesize distributed protocols.

The present subject matter herein is similar in spirit to above works, but technically different. In particular, input examples and target program described herein are designed specific to the SDN domain, and have different characteristics, which requires different synthesis algorithms.

Recent work proposes new abstractions of policies based on state machines [17, 4, 12] and shows that state machine abstraction benefits from fast execution on data plane [17, 4], and conciseness of programming [12]. The abstraction of policy tables described herein is similar in spirit to these state machine abstractions and thus can benefit from the advantages from previous work. However, in contrast, the subject matter described herein focus on providing an intuitive programming framework which can generate policies directly from examples.

10. Conclusion

The subject matter described herein relates to various methods, techniques, and mechanisms for generating SDN policies and/or other policies or settings using scenario based programming, e.g., generating network policy implementations from example scenarios.

In testing, an exemplary system in accordance with aspects of the subject matter described herein was observed to be expressive and supportive of a wide range of policies while having low overhead compared to imperative implementations. Using this exemplary system, several policies were implemented in an intuitive and concise manner compared to alternative approaches. Further, an exemplary system in accordance with aspects of the subject matter described herein is usable for rapid prototyping and for shortening the design and/or implementation iteration cycle.

Moving forward, a user study may be useful to gather feedback from a larger pool of users. Further, an exemplary system or framework in accordance with aspects of the subject matter described herein (e.g., system 200) may be combined with imperative languages or with a database query language for enabling complex policies, such as one that use thresholds in performing or not performing actions. Also, an exemplary system or framework in accordance with aspects of the subject matter described herein may use formal verification techniques to check scenarios against high level properties.

While various examples described herein related to SDN or SDN polices, it will be appreciated that aspects of the subject matter described herein may be usable in various networks, including non-SDN networks and non-SDN policies. For example, aspects of the subject matter described herein, e.g., a synthesis algorithm, may be usable for generating other types of settings and/or policies, such as Internet routing and wireless routing policies, based on user-provided scenarios.

REFERENCES

The disclosure of each of the following references is incorporated herein by reference in its entirety.

[1] M. Al-Fares, A. Loukissas, and A. Vandat. A scalable, commodity data center network architecture. *SIGCOMM CCR*, 2008.
[2] C. J. Anderson, N. Foster, A. Guha, J.-B. Jeannin, D. Kozen, C. Schlesinger, and D. Walker. Netkat: Semantic foundations for networks. In *POPL*, 2014.
[3] T. Ball, N. Bjørner, A. Gember, S. Itzhaky, A. Karbyshev, M. Sagiv, M. Schapira, and A. Valadarsky. Vericon: towards verifying controller programs in software-defined networks. In *PLDI*, 2014.
[4] G. Bianchi, M. Bonola, A. Capone, and C. Cascone. Openstate: programming platform-independent stateful openflow applications inside the switch. *SIGCOMM CCR*, 2014.
[5] M. Canini, D. Venzano, P. Peresini, D. Kostic, J. Rexford, et al. A nice way to test openflow applications. In *NSDI*, 2012.
[6] N. Foster, R. Harrison, M. J. Freedman, C. Monsanto, J. Rexford, A. Story, and D. Walker. Frenetic: A network programming language. In *ACM SIGPLAN Notices*, 2011.
[7] E. M. Gold. Complexity of automaton identification from given data. *Information and Control*, 1978.
[8] S. Gulwani. Automating string processing in spreadsheets using input-output examples. In *ACM SIGPLAN Notices*, 2011.
[9] D. Harel. Can programming be liberated, period? Computer, 2008.
[10] D. Harel and R. Marelly. *Come, lets play: Scenario based programming using LSCs and the Play-Engine*, volume 1. Springer, 2003.
[11] D. Harel, A. Marron, and G. Weiss. Behavioral programming. *CACM*, 2012.
[12] H. Kim, J. Reich, A. Gupta, M. Shahbaz, N. Feamster, and R. Clark. Kinetic: Verifiable dynamic network control. In *NSDI*, 2015.
[13] B. Lantz, B. Heller, and N. McKeown. A network in a laptop: rapid prototyping for software-defined networks. In *HotNets*, 2010.
[14] B. T. Loo, T. Condie, M. Garofalakis, D. E. Gay, J. M. Hellerstein, P. Maniatis, R. Ramakrishnan, T. Roscoe, and I. Stoica. Declarative Networking. In *CACM*, 2009.
[15] C. Monsanto, N. Foster, R. Harrison, and D. Walker. A compiler and run-time system for network programming languages. *ACM SIGPLAN Notices*, 2012.
[16] C. Monsanto, J. Reich, N. Foster, J. Rexford, D. Walker, et al. Composing software defined networks. In *NSDI*, 2013.
[17] M. Moshref, A. Bhargava, A. Gupta, M. Yu, and R. Govindan. Flow-level state transition as a new switch primitive for sdn. In *HotSDN*, 2014.
[18] A. Tootoonchian, S. Gorbunov, Y. Ganjali, M. Casado, and R. Sherwood. On controller performance in software-defined networks. In *HotICE*, 2012.
[19] A. Udupa, A. Raghavan, J. V. Deshmukh, S. Mador-Haim, M. M. Martin, and R. Alur. Transit: specifying protocols with concolic snippets. In *ACM SIGPLAN Notices*, 2013.
[20] A. Voellmy, J. Wang, Y. R. Yang, B. Ford, and P. Hudak. Maple: Simplifying sdn programming using algorithmic policies. In *SIGCOMM*, 2013.
[21] Y. Yuan, R. Alur, and B. T. Loo. Netegg: Programming network policies by examples. In *HotNets*, 2014.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for generating SDN policies, the system comprising:
a processor;
a memory; and
an SDN policy synthesizer (SPS) implemented using the processor and the memory, wherein the SPS is configured to receive scenario based information indicating one or more behaviors for at least one SDN policy, to execute, using the processor, a synthesis algorithm for generating the at least one SDN policy based on the scenario based information, and to provide, via an SDN communications interface, the at least one SDN policy to an SDN controller, wherein the synthesis algorithm generates the at least one SDN policy by deriving potential rules for the at least one SDN policy based on a number of possible reads and writes to at least one state table associated with the scenario based information, testing each of the potential rules using one or more concrete values to determine whether an outcome is consistent with the scenario based information; and selecting, from the potential rules, one or more rules that are consistent with the scenario based information for the at least one SDN policy.

2. The system of claim 1 wherein the scenario based information includes one or more timing diagrams.

3. The system of claim 1 wherein the SPS is configured to identify conflicts associated with the scenario based information.

4. The system of claim 1 wherein the at least one SDN policy includes at least one policy rule and at least one state information rule.

5. The system of claim 1 wherein the at least one SDN policy has the smallest number of rules among SDN policies that are consistent with the scenario based information.

6. The system of claim 1 comprising:
a second processor;
a second memory; and
an SDN policy interpreter (SPI) implemented using the second processor and the second memory, wherein the SDN policy interpreter (SPI) is at the SDN controller and is configured to interpret the at least one SDN policy and perform at least one action.

7. The system of claim 6 wherein the at least one action includes executing the at least one SDN policy, processing packets at the SDN controller, instructing a network node, or installing a rule at a network node.

8. The system of claim 7 wherein the network node includes a switch, a router, a learning switch, a deep packet inspection (DPI) node, a firewall, a stateful firewall, a transmission control protocol (TCP) firewall, or an address resolution (ARP) proxy.

9. A method for generating SDN policies, the method comprising:
at an SDN policy synthesizer (SPS) implemented using a processor and a memory:
receiving scenario based information indicating one or more behaviors for at least one SDN policy;
executing, using the processor, a synthesis algorithm for generating the at least one SDN policy based on the scenario based information, wherein the synthesis algorithm generates the at least one SDN policy by deriving potential rules for the at least one SDN policy based on a number of possible reads and writes to at least one state table associated with the scenario based information, testing each of the potential rules using one or more concrete values to determine whether an outcome is consistent with the scenario based information; and selecting, from the potential rules, one or more rules that are consistent with the scenario based information for the at least one SDN policy; and
providing, via an SDN communications interface, the at least one SDN policy to an SDN controller.

10. The method of claim 9 wherein the scenario based information includes one or more timing diagrams.

11. The method of claim 9 wherein receiving scenario based information indicating one or more behaviors for at least one SDN policy includes identifying conflicts associated with the scenario based information.

12. The method of claim 9 wherein the at least one SDN policy includes at least one policy rule and at least one state information rule.

13. The method of claim 9 wherein the at least one SDN policy has the smallest number of rules among SDN policies that are consistent with the scenario based information.

14. The method of claim 9 wherein providing the at least one SDN policy to the SDN controller includes interpreting, by an SDN policy interpreter (SPI) implemented at the SDN controller and using a second processor and a second memory, the at least one SDN policy and performing at least one action.

15. The method of claim 14 wherein the at least one action includes executing the at least one SDN policy, processing packets at the SDN controller, instructing a network node, or installing a rule at a network node.

16. The method of claim 15 wherein the network node includes a switch, a router, a learning switch, a deep packet inspection (DPI) node, a firewall, a stateful firewall, a transmission control protocol (TCP) firewall, or an address resolution (ARP) proxy.

17. A non-transitory computer readable medium having stored thereon executable instructions that when executed by a processor of a computer causes the computer to perform steps comprising:
at an SDN policy synthesizer (SPS) implemented using a processor and the memory:
receiving scenario based information indicating one or more behaviors for at least one SDN policy;
executing, using the processor, a synthesis algorithm for generating the at least one SDN policy based on the scenario based information, wherein the synthesis algorithm generates the at least one SDN policy by deriving potential rules for the at least one SDN policy based on a number of possible reads and writes to at least one state table associated with the scenario based information, testing each of the potential rules using one or more concrete values to determine whether an outcome is consistent with the scenario based information; and selecting, from the potential rules, one or more rules that are consistent with the scenario based information for the at least one SDN policy; and
providing, via an SDN communications interface, the at least one SDN policy to an SDN controller.

18. The non-transitory computer readable medium of claim 17 wherein the scenario based information includes one or more timing diagrams.

19. The non-transitory computer readable medium of claim 17 wherein receiving scenario based information indicating one or more behaviors for at least one SDN policy includes identifying conflicts associated with the scenario based information.

20. The non-transitory computer readable medium of claim 17 wherein the at least one SDN policy includes at least one policy rule and at least one state information rule.

* * * * *